United States Patent
Joelson

[15] 3,696,182
[45] Oct. 3, 1972

[54] METHOD FOR PRODUCING CONCRETE PIPE

[72] Inventor: Carl R. Joelson, 312 Harbor Drive, Venice, Fla. 33593

[22] Filed: June 29, 1970

[21] Appl. No.: 60,172

Related U.S. Application Data

[62] Division of Ser. No. 797,606, Feb. 7, 1969, Pat. No. 3,584,356.

[52] U.S. Cl. .....................264/72, 425/424, 425/432
[51] Int. Cl. ............................B28b 1/08, B28b 21/00
[58] Field of Search ....264/69, 71, 333, 72; 425/424, 425/432

[56] References Cited

UNITED STATES PATENTS

| | | |
|---|---|---|
| 3,119,165 | 1/1964 | Gourlie.....................425/424 |
| 3,201,843 | 8/1965 | Osweiler...................425/424 |
| 3,461,516 | 8/1969 | Boucher....................425/424 |
| 3,419,649 | 12/1968 | Livingston et al. ..........264/71 |
| 3,551,967 | 1/1971 | Williams.....................264/69 |
| 3,107,158 | 10/1963 | Ahlberg.....................264/71 |

*Primary Examiner*—Robert F. White
*Assistant Examiner*—Jeffery R. Thurlow
*Attorney*—Stevens, Davis, Miller & Mosher

[57] ABSTRACT

An improved method for forming hollow cylindrical bodies having any geometric cross-section of reinforced concrete comprising sequentially forming a mold with bottom, inner and outer wall forms and reinforcement positioned between the wall forms, which forms are assembled to provide a controlled pressure seal between the bottom form and the outer form and the bottom form and the inner form, filling the thus-formed mold with concrete while applying vibration to the thus-formed mold, positioning a top form on the filled form and applying vibration to same, stopping the applications of vibration and sequentially upwardly stripping the inner and outer wall forms from the molded body while leaving the bottom and top forms on the molded body, the controlled pressure seals being liquid-tight and resisting the transmission of the vibrations between the mold forms.

11 Claims, 19 Drawing Figures

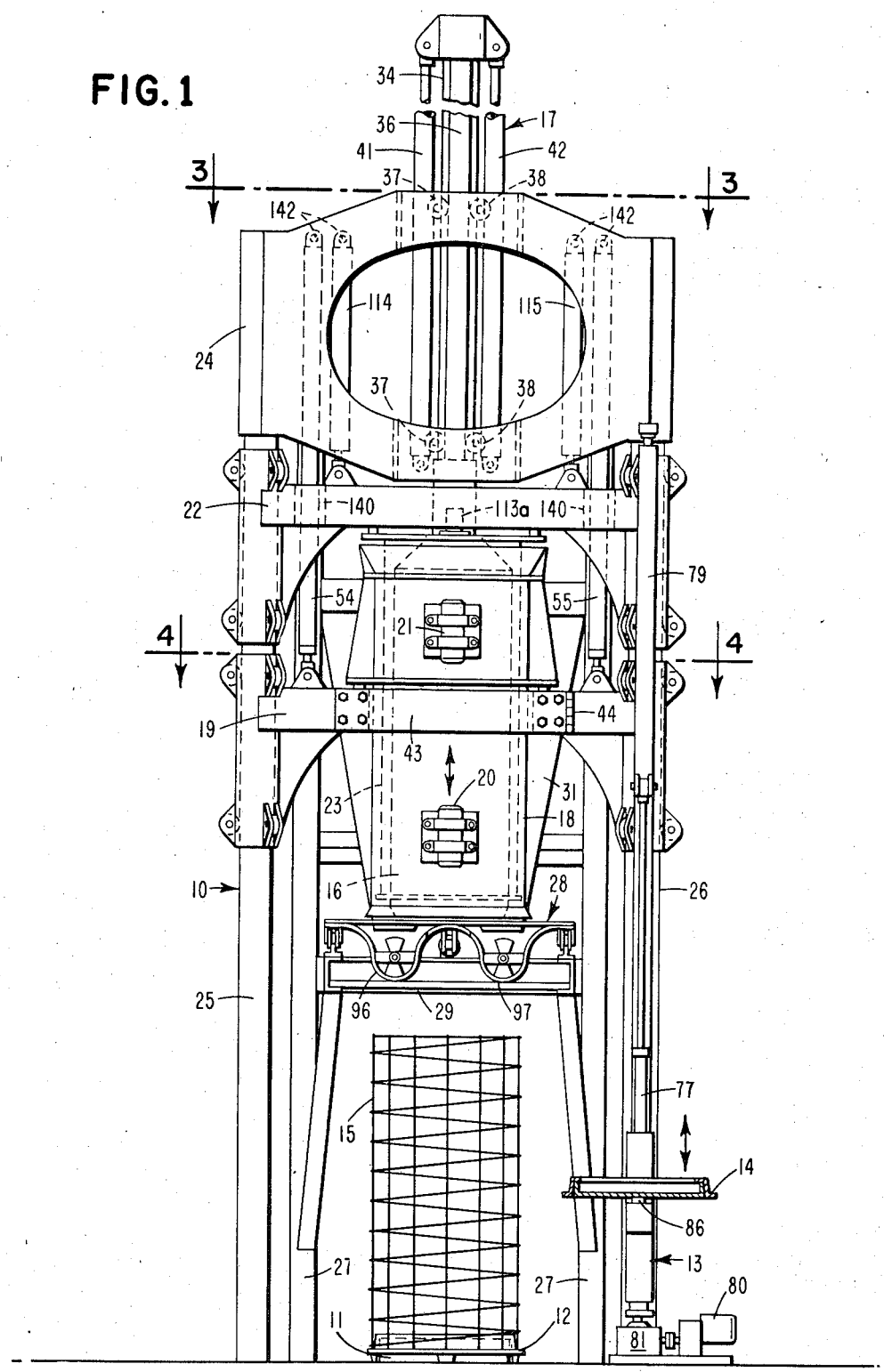

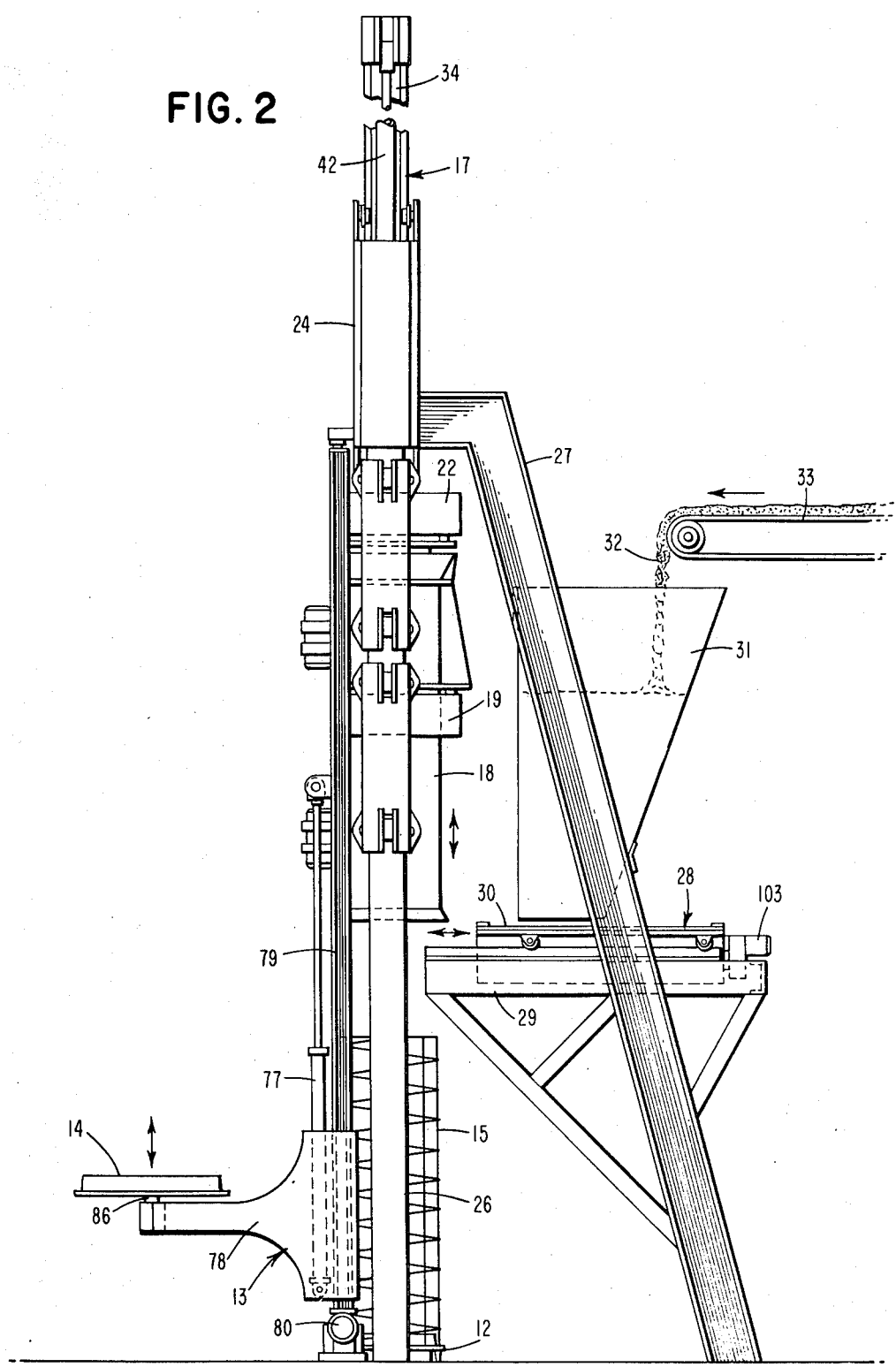

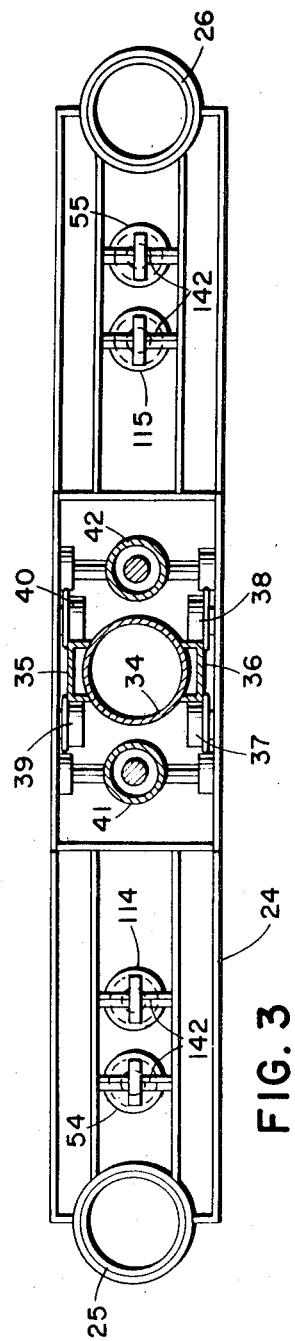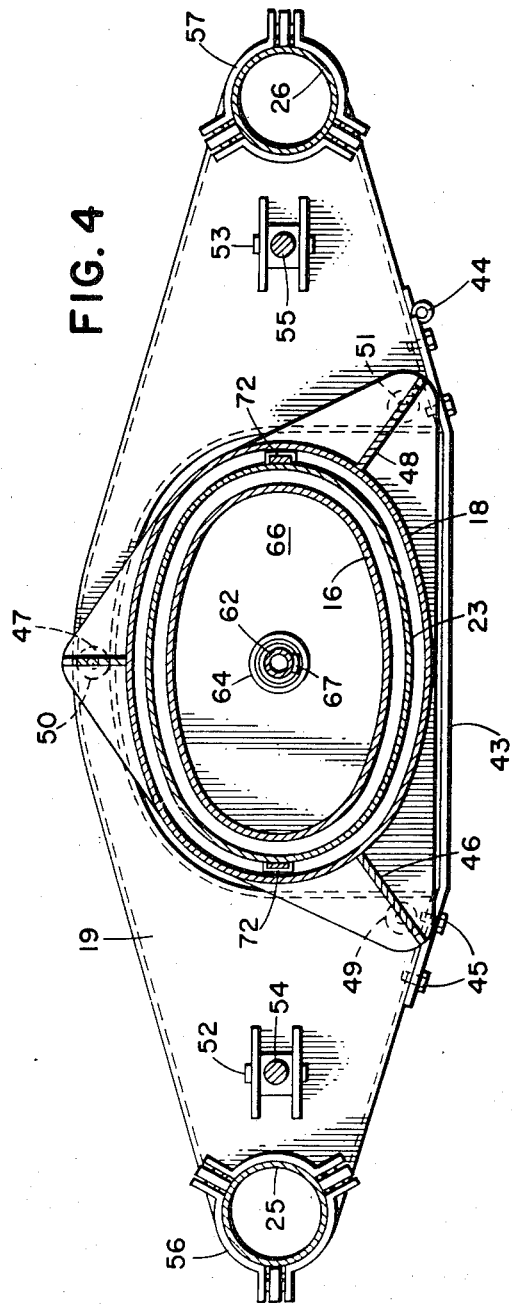

PATENTED OCT 3 1972 3,696,182
SHEET 04 OF 13
FIG. 5
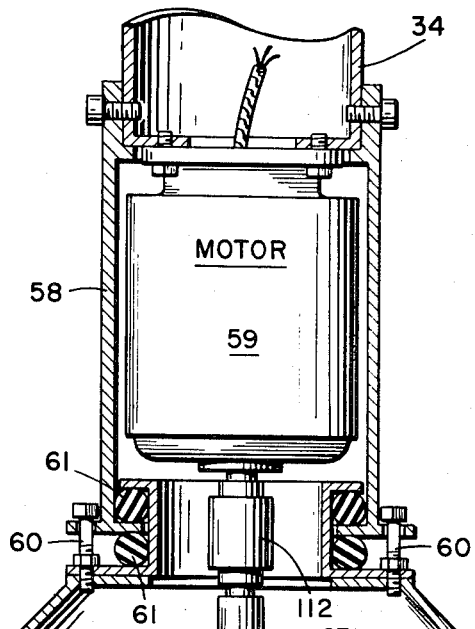
FIG. 6
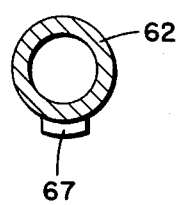
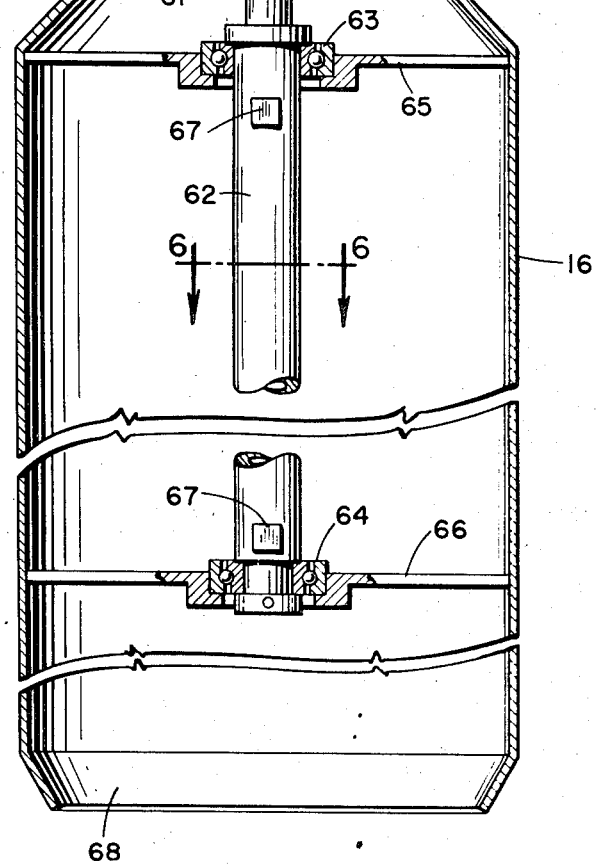
INVENTOR
CARL. R. JOELSON
BY Stevens, Davis, Miller & Mosher
ATTORNEYS

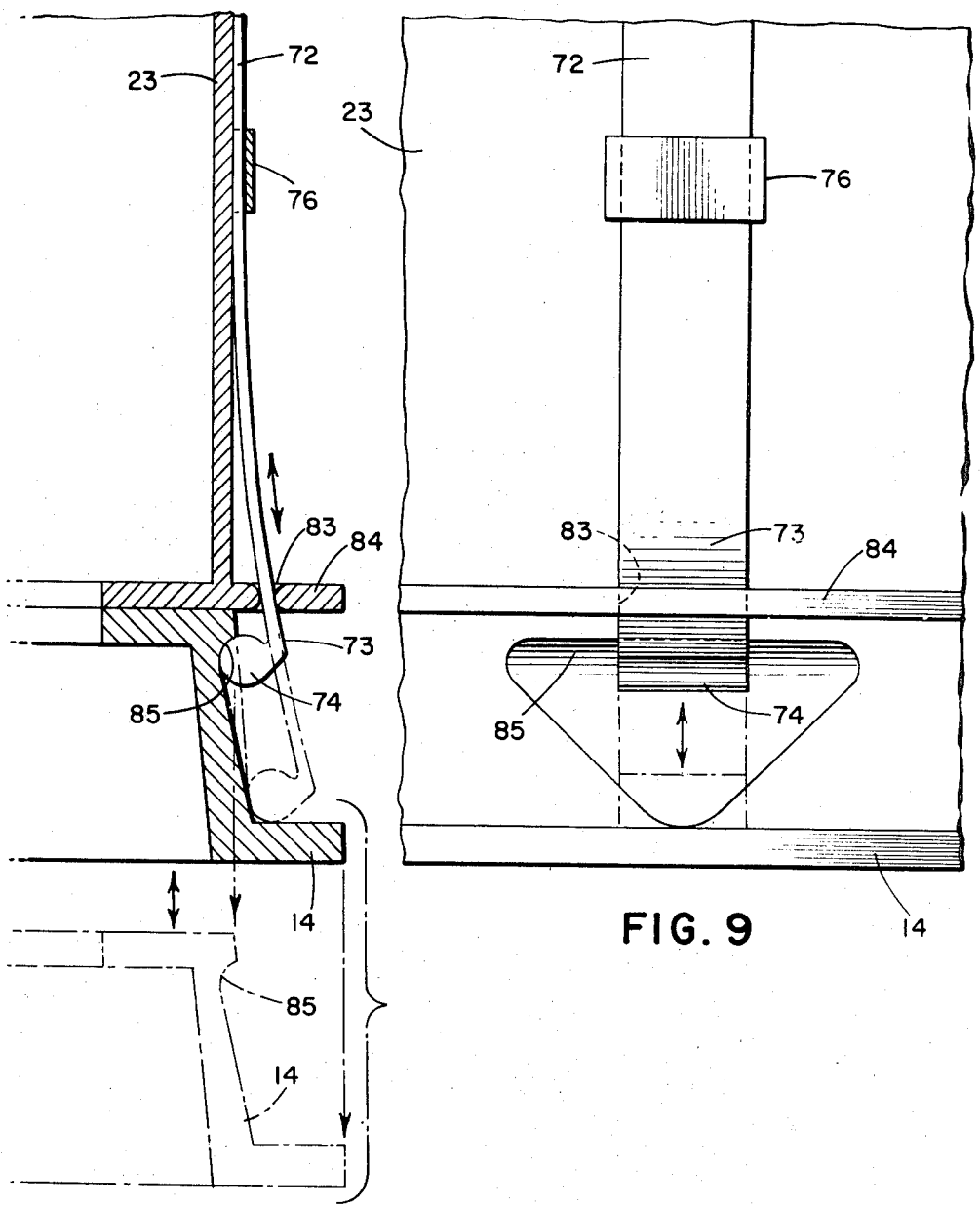

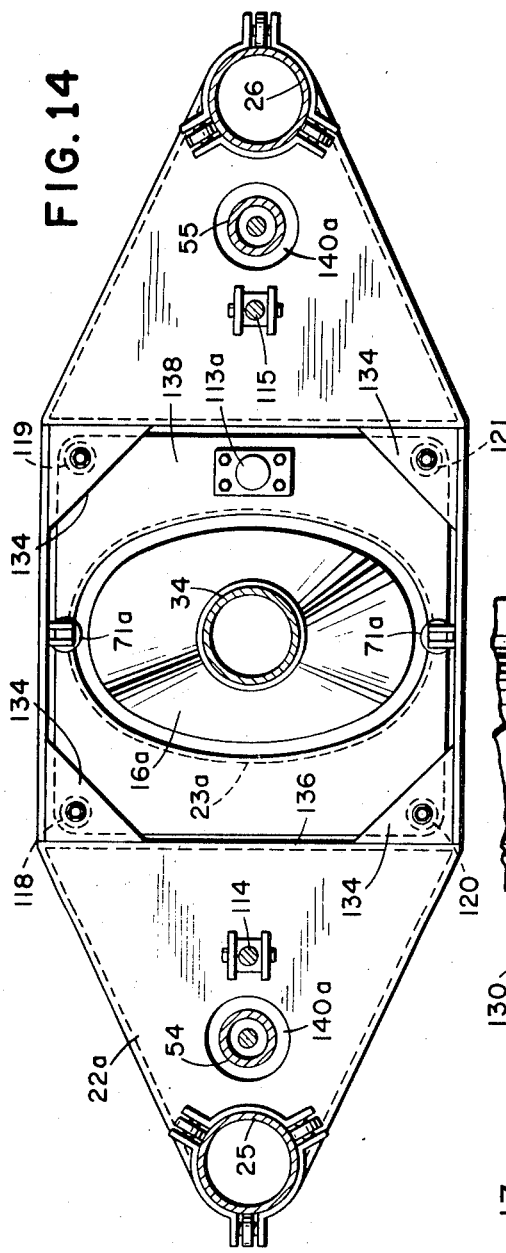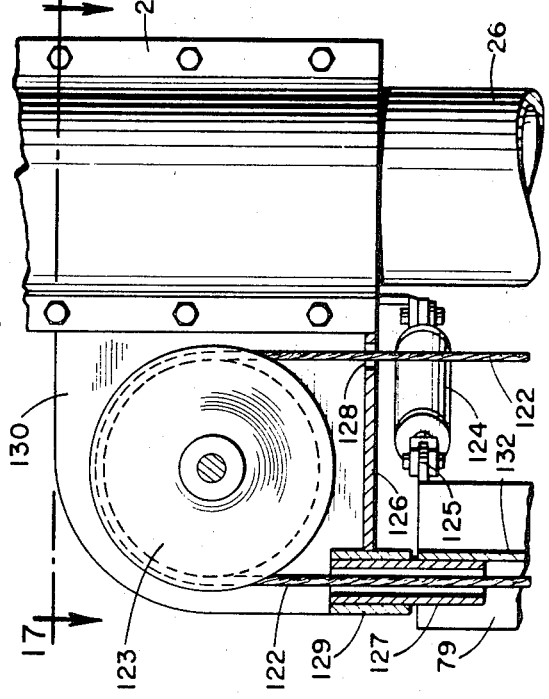

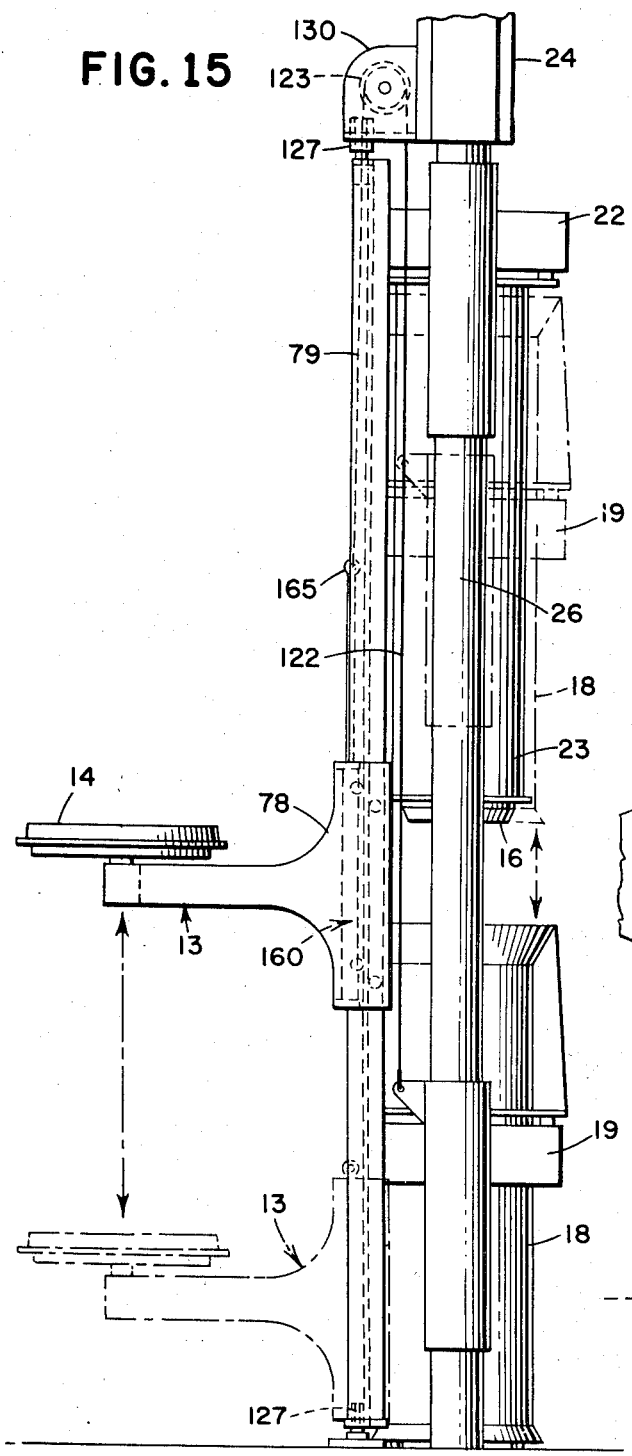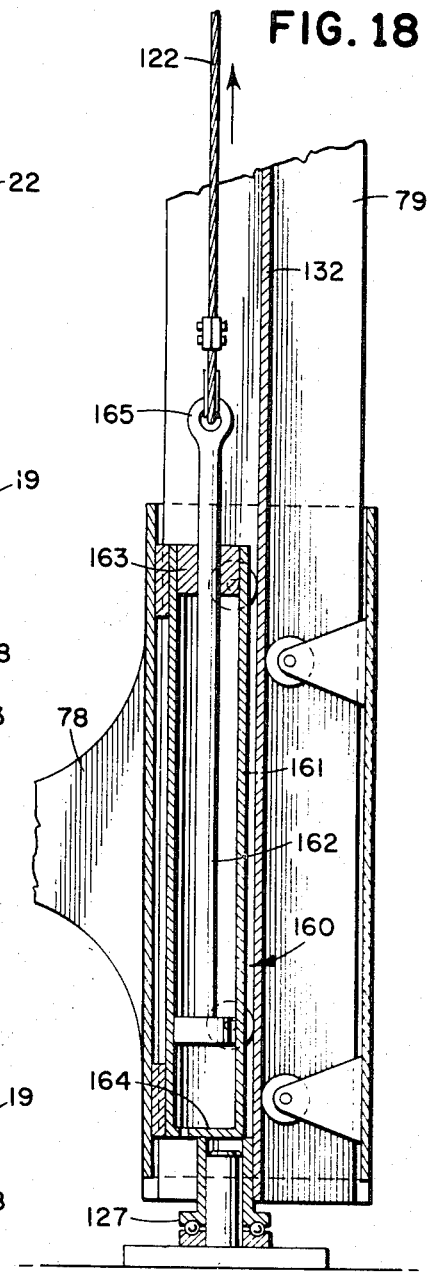

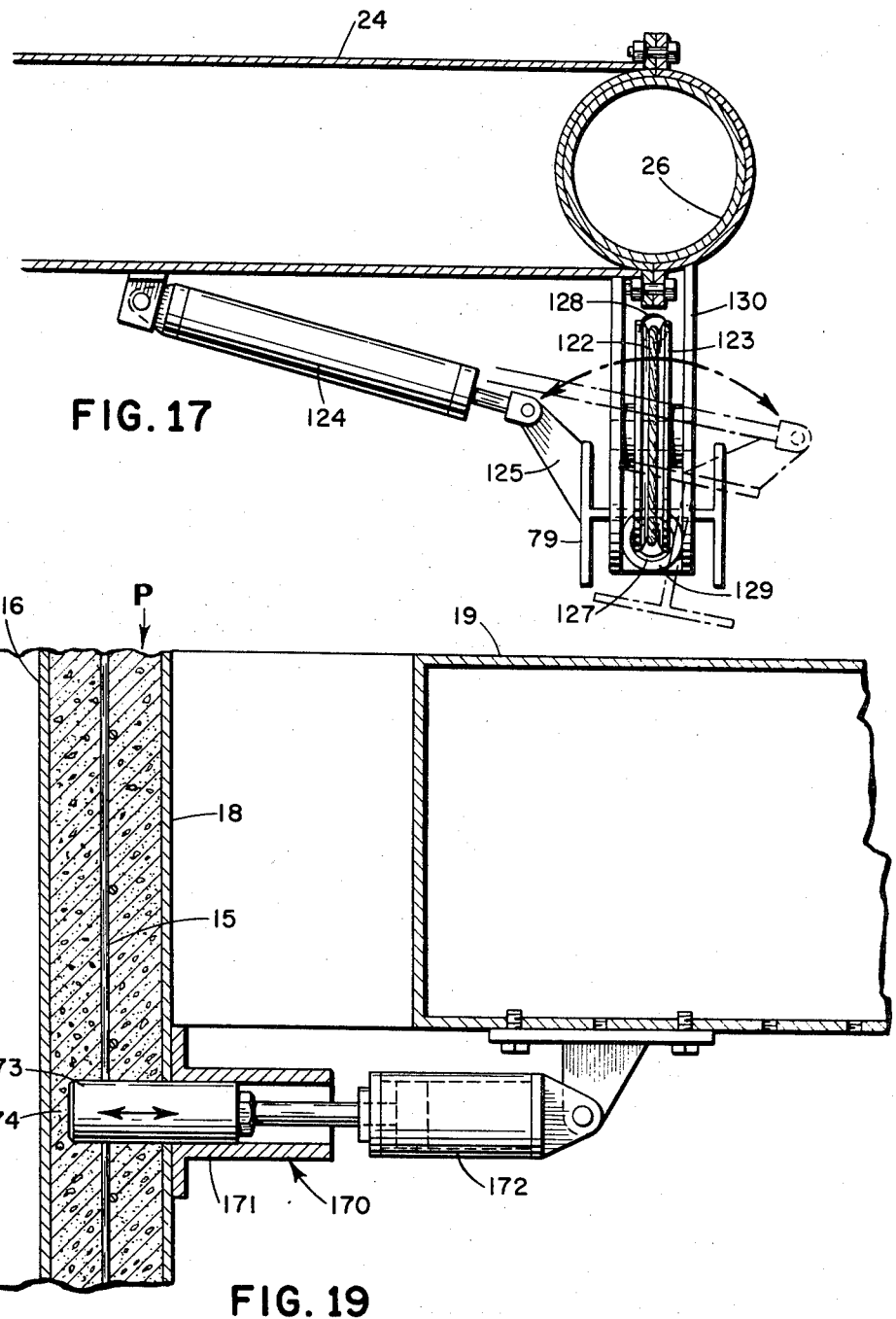

METHOD FOR PRODUCING CONCRETE PIPE

The present application is a division of my application Ser. No. 797,606 filed Feb. 7, 1969, now U.S. Pat. No. 3,584,356.

The present invention relates to an improved method for forming a reinforced concrete pipe. The concrete pip is manufactured in a vertical position and it may be of any suitable shape, such as circular, elliptical, arch shaped, or any other noncircular shape that is not economically produced on conventional pipe making machinery. The invention particularly relates to a vibrating pipe manufacturing method in which the inner and outer pipe forming members are removed from the newly made pipe while the pipe is still in a vertical upright position, with the upward movement of the members being described as extracting, withdrawing, or stripping the members from the newly formed and uncured pipe.

In vibration methods for the manufacture of concrete pipe, the pipes are formed by four basic steps: first, a bottom pallet is placed in the machine to form the bottom of the pipe giving it the shape of a groove or tongue. This bottom pallet stays with the pipe when it is removed from the machine and aids in supporting the green or uncured pipe. Second, an outer form, referred to as a jacket, is positioned on the pallet to form the outside of the pipe. Third, an inner form, referred to as a core, is positioned concentrically within the jacket to form the inside of the pipe. Fourth, after the concrete has been poured into the mold, a top ring or pallet is positioned on top of the pipe to form a groove or a tongue. This top pallet also usually stays with the pipe when it is removed from the molding station.

In all vibrating methods the jacket, bottom pallet, and core form a mold. Damp "no-slump" concrete mix is poured into the annular space formed between the jacket and core and is then compacted by vibration in various ways. Under intense vibration the damp concrete mix turns into a fluid mix as it is settled in the mold. After the vibrating mold is filled to a predetermined height, and while the mix is still fluid, a top pallet or ring is placed in pressure contact with the cement mix in the top of the mold and forms the upper groove or tongue of the pipe.

Other types of pipe forming methods have compacting of "no-slump" concrete accomplished by pressure, such as pounding or tamping in a tamping machine, as described in U.S. Pat. No. 1,961,981 to Pechstadt and U.S. Pat. No. 1,359,543 to Smith, and rolling or sliding pressure on packer head machines so that the damp concrete mix never turns fluid.

It is in the vibrating mold that the finer particles of the fluid mix, i.e., a mixture of water, cement, and fine sand, hereinafter called cement slurry, will leak out of the smallest openings. A common and inherent weakness of all previous vibrating machines, such as those described in U.S. Pat. Nos. 3,119,165 and 3,273,216 to Gourlie, is the leakage of cement slurry at the junction of the jacket and the bottom pallet and/or at the junction of the bottom pallet and core or both places. In still other machines there is additional leakage at the vertical joints of one piece and two piece jackets and one piece cores.

The loss of this cement slurry from the mold is serious since it both weakens the pipe and detracts from its appearance. The cement slurry is also a grinding compound and when it fails or splatters on the moving parts of the apparatus it causes unnecessary wear and substantial maintenance problems. It also increases manufacturing costs by creating a clean up and disposal problem for the wasted cement slurry.

In those methods such as described in U.S. Pat. No. 2,966,716 to Pratt and U.S. Pat. Nos. 3,047,929 and 3,334,390 to Steiro, that strip the core or jacket, or both, downward from ground level or the machine level into a pit, the various kinds of rubber or elastic seals presently in use are subject to the abrasive action of the sliding core or jacket that is covered with a grinding compound in the form of a cement slurry. The resultant wear permits the cement slurry to leak out, in proportion to the amount of wear, and continues until the seal is adjusted or replaced. Another serious disadvantage of stripping downward is the deep and expensive pit required to accommodate the descending core and/or jacket and necessary machinery. Also the leakage of cement slurry into this deep pit results in a serious wear and clean-up problem.

In other types of machines, if the seal is tight enough to make the mold liquid tight, then the vibration is either greatly dampened with resulting inferior pipe or excessive vibration is required which consumes additional power and shortens the useful life of both the mold and machinery.

In still other types of machines the full weight of the jacket or core or both rest on elastic sealing rings with similar undesirable resulting wear and leakage.

The following new methods and improvements in the steps above outlined result in a superior reinforced concrete pipe formed at lower cost. The inventive method includes first lowering the jacket onto the bottom pallet, inserting and locking up the top pallet to the top pallet holding header, lowering the core through the top pallet and onto the bottom pallet to complete a liquid-tight mold with the top pallet positioned ready to form the top end of the pipe at the proper time. The concrete mix is poured into the mold on opposite sides of the core eliminating the need for rotating the mold while feeding the mix from a fixed point or using a rotating distributor on a non-rotating mold or some other equally complicated device. The jacket and core are vibrated simultaneously while the concrete mix is poured into the mold and additional vibration is applied to the top pallet holding header while forming the top end of the pipe with the top pallet. The top pallet is released from the top pallet holding header which is then raised slightly. The core and jacket are stripped upwardly and the top pallet remains with the completed pipe ready to be removed from the machine.

A primary or fundamental solution of the invention to the leakage problem is the manner in which the sealing of the junction of the jacket, bottom pallet, and core is accomplished. However, to be effective and long lasting under the most adverse conditions, the following requirements also have to be met: the centering and aligning of the non-circular pallet relative to the core must be accurate, a rigid structure should provide a means of resiliently suspending and controlling the core and jacket perpendicularly and radially at a controlled height relative to the bottom pallet and in near perfect alignment therewith, and practical means must be provided for vibrating the core and jacket simultaneously so that the vibration does not have to be transmitted from the jacket to the surface of the core (or inside of the pipe), or from the core to the surface of the jacket (or outside the pipe). This permits the intensity or severity of the vibration to be cut by fifty percent or more between the bottom pallet and the sides of the mold.

It is therefore an object of the present invention to provide for manufacturing reinforced concrete pipe by the following steps, some of which are common to the above-mentioned prior art:

The jacket and core are moved vertically downward onto a bottom pallet to form a liquid-tight mold, concrete mix is poured into the mold and vibrated, the top of the pipe is formed by a top pallet, and the core and jacket are removed from the green pipe leaving the bottom and top pallets on the pipe so that it may be readily removed from the machine.

It is another object of the present invention to provide a method which will readily and economically produce reinforced concrete pipe of substantially any geometrical cross section with ready conversion from one to another of these shapes.

It is yet another object of the present invention to provide a method which obviates the need for any large pits or other subsurface structure.

It is another object of the present invention to provide an improved means for positioning the top pallet both in the machine and on the pipe.

It is a further object of the present invention to provide adequate sealing between the bottom pallet, core, and jacket so as to prevent leakage of the concrete slurry during the vibration phase.

It is still another object of the present invention to provide a method for producing reinforced concrete pipes which may be readily and economically produced.

The means for accomplishing the foregoing objects and other advantages, which will be apparent to those skilled in the art, are set forth in the following specification and claims, and are illustrated in the accompanying drawings dealing with a basic embodiment of an apparatus to carry out the present invention. Reference is made now to the drawings in which:

FIG. 1 is a front view of the device used with the present invention;

FIG. 2 is a side view of the present invention;

FIG. 3 is a section taken along line 3—3 of FIG. 1;

FIG. 4 is a section taken along line 4—4 of FIG. 1;

FIG. 5 is a longitudinal section through the core of the device;

FIG. 6 is section taken along line 6—6 of FIG. 5;

FIG. 8 is an enlarged vertical section of the lower end of the top pallet holding header, showing the method of clamping the top pallet to the header;

FIG. 9 is a side view of the assembly shown in FIG. 8;

FIG. 14 is a top plan view of the second crosshead of an alternate embodiment of the invention;

FIG. 15 is a side elevation of an alternate top pallet positioning device;

FIG. 16 is an enlarged detail of the pulley arrangement of FIG. 15;

FIG. 17 is a horizontal section taken along line 17—17 of FIG. 16,

FIG. 18 is a vertical section of the lost motion device of FIG. 15; and

FIG. 19 shows a device for making a lift hole.

Figure 11:
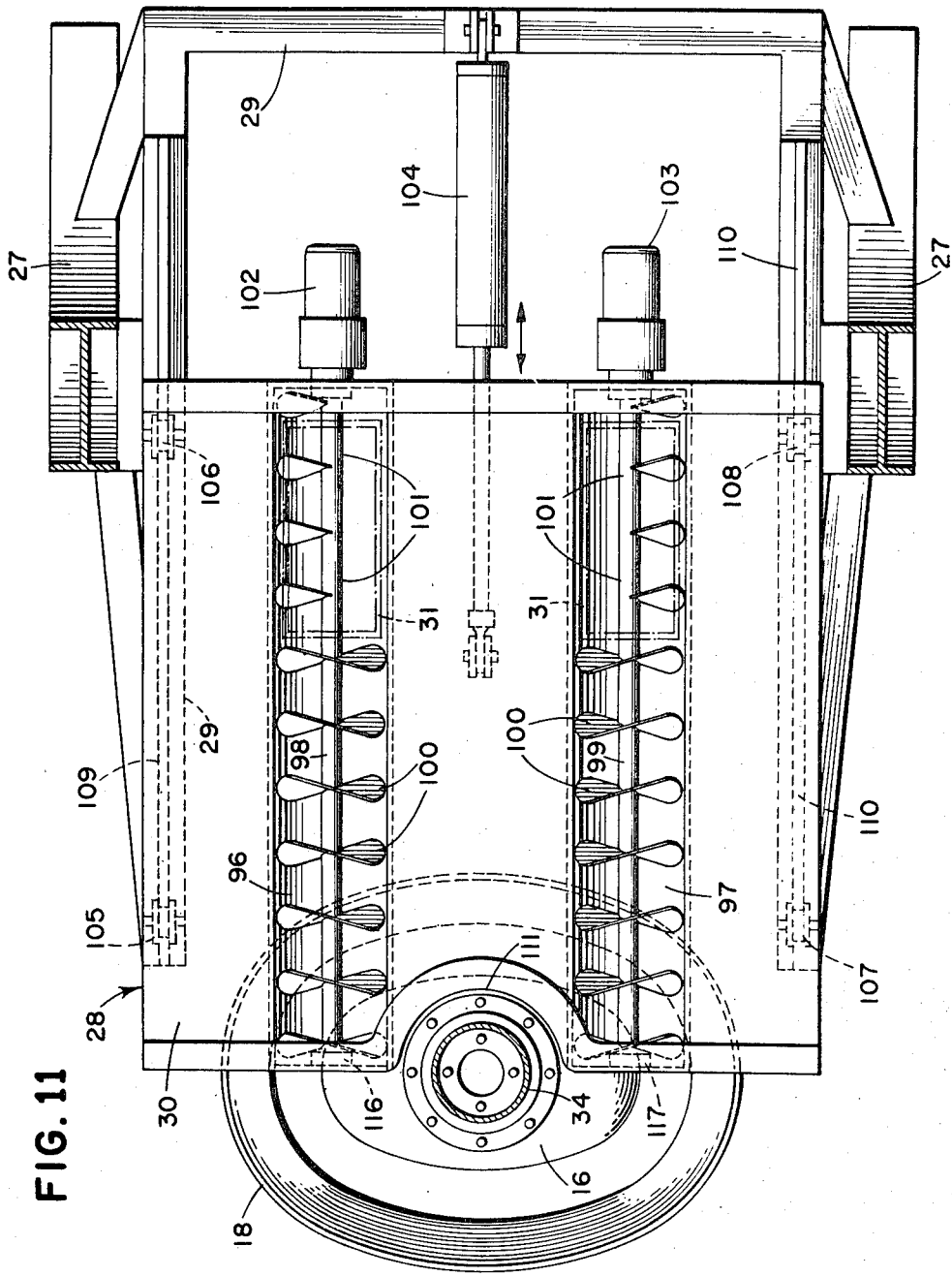
FIG. 11 is a plan view of the concrete distributor means.

Referring now to FIG. 1, apparatus to carry out the present invention generally comprises a frame 10, a bottom pallet saddle 11 having a bottom pallet 12 mounted thereon, a top pallet positioning device 13 and a top pallet 14, a wire reinforcement cage 15, a core 16, means 17 for moving the core vertically, jacket 18, first crosshead 19 movably mounted on the frame to vertically move the jacket, lower and upper vibrators 20 and 21, respectively, mounted on the jacket, second crosshead 22 supporting top pallet holding header 23 and fixed top crosshead 24. The frame 10 comprises two vertical members 25 and 26 and inclined rear support legs 27. The concrete distributing means 28, shown in FIG. 2, includes a frame 29 fixedly mounted on the rear support legs 27. A trough 30, which has two identical portions each of which contains a screw member and which will be described in detail with reference to FIG. 11, is movably mounted on frame 29. A divided hopper 31 is positioned over the trough and receives "no-slump" concrete 32 from a conveyor belt 33 or other means and delivers it to the trough.

FIG. 3 is a section view taken along line 3—3 of FIG. 1 and shows the crosshead 24 fixedly mounted on the vertical frame members 25 and 26. Centrally mounted in the header is a vertical member 34 extending upward from the core 16. This member includes rectilinear flange means 35 and 36 which ride against flanged positioning wheels 37 to 40 to maintain the alignment of the core as it is moved vertically by the fluid actuated piston cylinder assemblies 41 and 42.

Turning now to FIG. 4, the first crosshead 19 is provided with a removable gate portion 43 hingedly mounted on the crosshead by hinge 44 and secured in a closed position by bolts 45. When the gate is opened, it provides access to the jacket and core for their exchange, replacement, and/or maintenance. The jacket 18 is suspended from the first crosshead 19 by any convenient means, here shown as a three point suspension, noted here by flanges 46 to 48. Resilient pads 49 to 51 are positioned between the crosshead and jacket flanges 46 to 48, respectively, at the points of suspension and permit movement in the horizontal direction only. Clearly any number of points of suspension can be used with the number of points of suspension being dictated by the shape of the mold. Also shown in this figure are the crosshead connections 52 and 53 for the piston-cylinder assemblies 54 and 55, connected through holes 140 in the second crosshead 22 to the fixed crosshead 24 at points 142, which raise and lower the first crosshead and jacket during the operation of the machine. Cylindrical guides 56 and 57, each of which is provided with a plurality of rollers, serve to movably mount the crosshead on the vertical frame members 25 and 26. It should also be noted that while the figures show the longer axis of the pipe in alignment with the axis of the frame, the pipe can be manufactured with its longer axis perpendicular to the frame axis, as shown in FIG. 14.

Turning now to FIG. 5, the upper vertical member 34 is bolted to an intermediate portion 58 which contains therein the core vibrating motor 59. The intermediate portion is resiliently fastened to the core 16 by means of bolts 60 and ring gaskets 61. The bolts 60 loosely connect the core 16 to the intermediate portion 58 to isolate vertical member 34 from the vibration developed. A vibrator shaft 62 is connected to the motor by a flexible coupling 112 and depends into the core and is rotatably journaled in bearings 63 and 64. The bearings 63 and 64 are positioned within the core by plate assemblies 65 and 66, respectively.

FIG. 6 shows a cross section of the shaft 62 noting relatively small masses of metal 67 attached to one side of the shaft 62 adjacent the bearings 63 and 64 for effecting the vibration as the shaft is rotated at high speed. Attention should be directed to the conically tapered bottom portion 68 of the core which will be described later in connection with the sealing of the mold.

Figure 7:
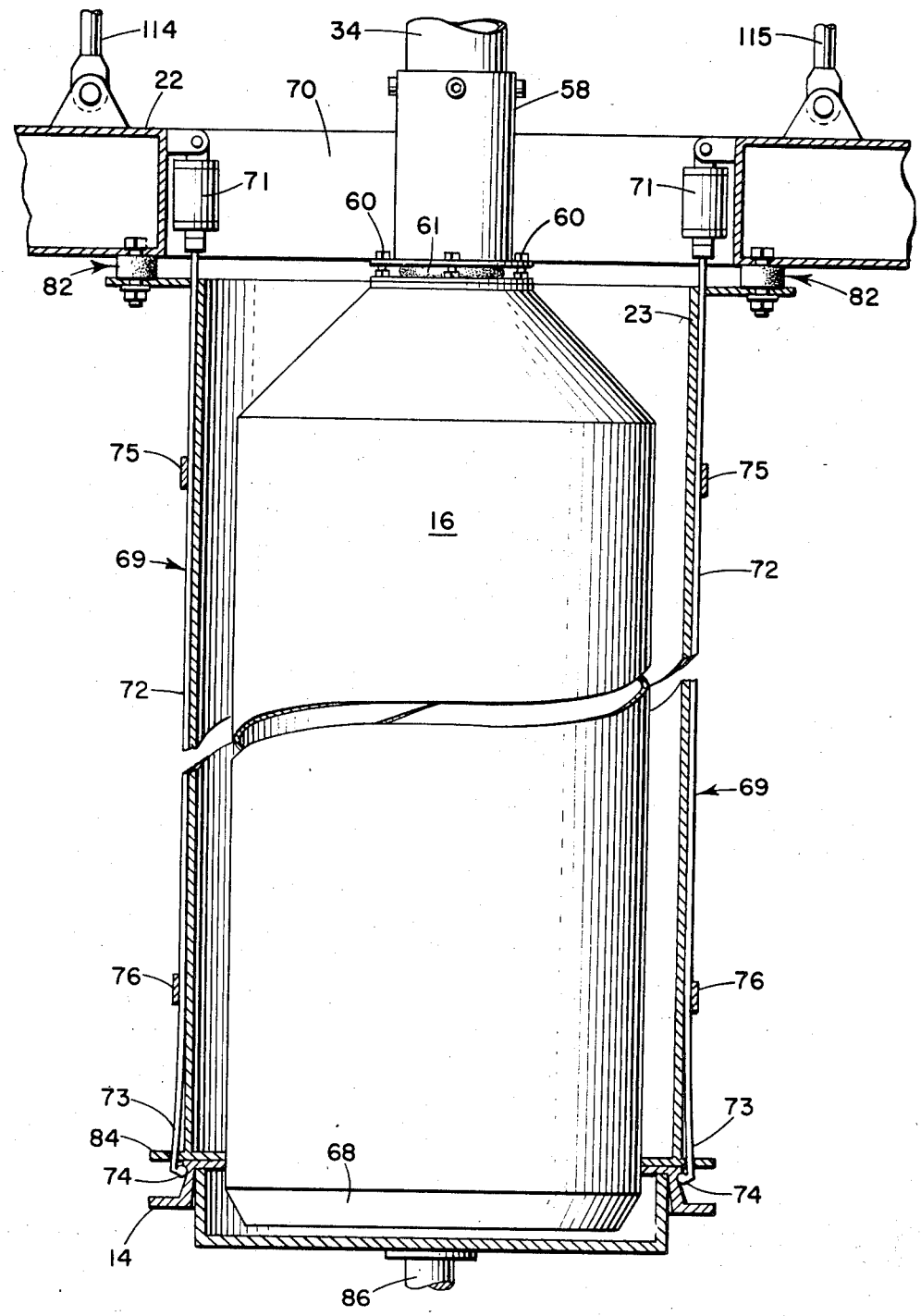
FIG. 7 is a partial longitudinal section showing the placement of the top pallet into position on the top pallet holding header.

FIG. 7 shows the second crosshead 22 movably mounted on the frame 10 and moved vertically by piston-cylinder assemblies 114 and 115. The top pallet holding header 23, including the pallet gripping means 69, is resiliently suspended from crosshead 22 by bolt and resilient pad assemblies 82. The number of gripping means will be dictated by the shape and weight of the top pallet. Two gripping means have been illustrated, one on each side of opening 70 in the crosshead. These means include a piston-cylinder assembly 71 having member 72 depending therefrom with the free end 73 thereof being resiliently biased outwardly and having at the end an inwardly directed flange 74. Members 72 are slidably held and guided by U-shaped brackets 75 and 76 spaced vertically on the side wall of header 23. While one specific arrangement has been shown, clearly other means for translating the vertical movement of members 72 to a clamping movement may be employed.

The top pallet positioning means 13 comprises a piston-cylinder assembly 77 for vertically moving a carrier 78 along a vertical H-beam 79, mounted parallel to frame member 26, to a position substantially equal to the bottom of the top header. Carrier 78 has an arm that extends at right angles to the H-beam and has a piston-cylinder assembly (not shown) at its outer end for raising the top pallet into position abutting the bottom of the header 23. The top pallet rests on a saddle attached to a piston rod 86 of the piston-cylinder assembly. Motor and speed reducer 80 drives a transmission 81 that rotates vertical shaft 79 on which the carrier 78 slides to position the top pallet immediately beneath the second crosshead where it is grasped by the pallet gripping means 69. It will be noted from FIG. 8 that as the top pallet is moved against the top header, the members 72 will be drawn upwardly by the piston-cylinder assemblies 71 so that the free ends 73 are cammed inwardly by slot 83 formed in the flange portion 84 of the bottom end of the header 23 until the inwardly directed flange 74 engages with a notch 85 formed in the top pallet 14 to fix it in place. Flange 84 also extends inwardly to aid the guiding of the core. FIG. 9 shows a member 72 holding the top pallet in clamped position on the header.

Figure 10:
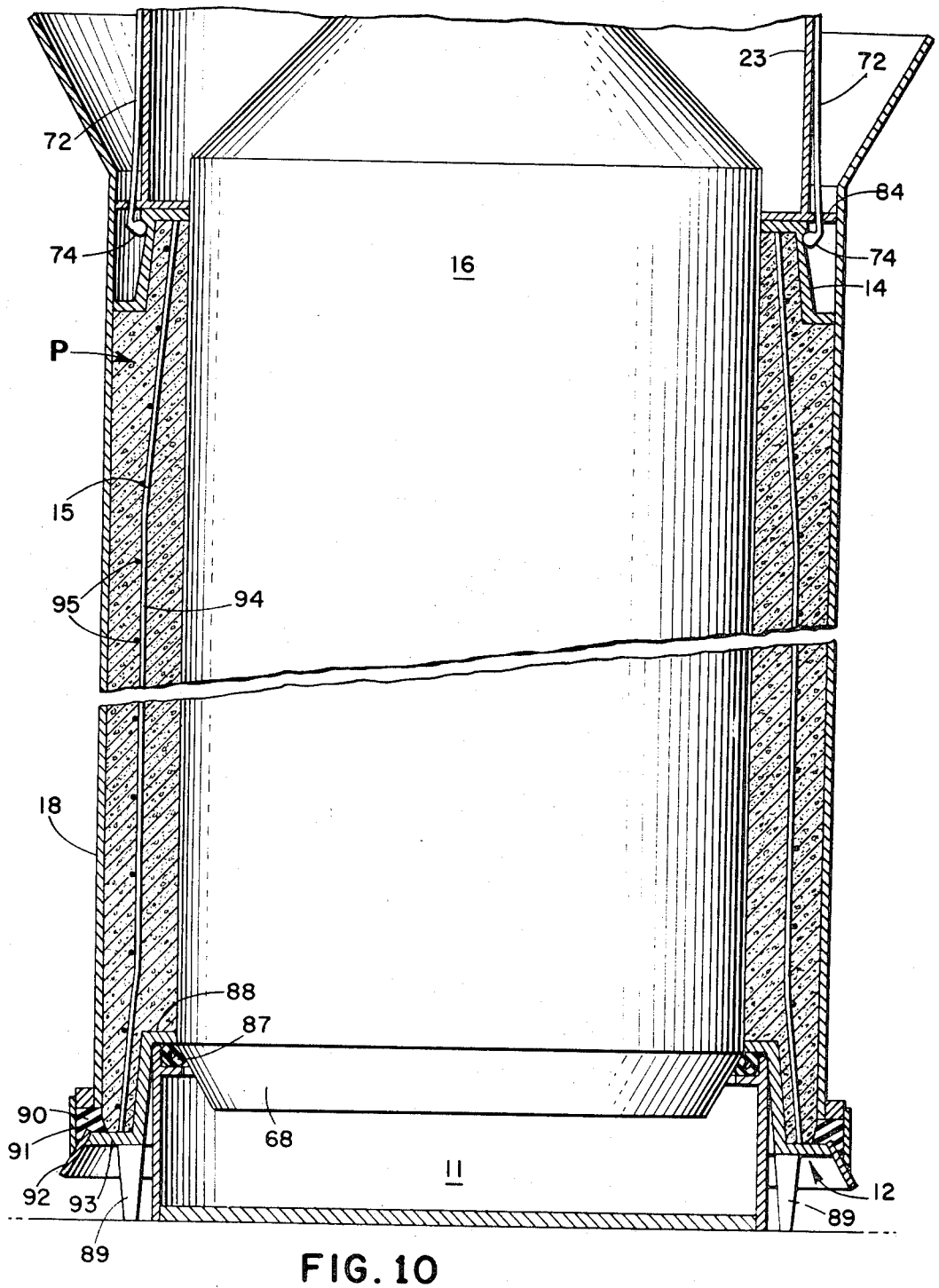
FIG. 10 is a vertical section showing the assembled mold and completed pipe immediately before disassembly of the mold.

FIG. 10 shows the apparatus just prior to stripping the mold from the pipe, namely, with the top and bottom pallets in place, the reinforcement in place in the poured and vibrated cement, the jacket and core in the downward position, and the top header in the down position. The pipe P fills the mold formed between the jacket 18 and the core 16. Particular attention should be directed to the sealing means shown in this figure. An annular sealing ring 87 is mounted on the lower pallet saddle 11 and engages with the inwardly tapered portion 68 of the core 16. An inwardly directed flange 88 of the lower pallet 12 presses downwardly upon the annular sealing ring 87 when the outer jacket is in place. The lower pallet is provided with several legs 89 which limit the downward movement of the pallet against the annular sealing ring 87, and also provide room for the forks or arms of an off loading means to be inserted under the bottom edge of the pallet to remove the pipe from the machine. The jacket is provided on its lower end with an annular sealing ring 90 and an annular flange 91 and annular conical flange 92 which engage with and form an effective seal with the bottom flange 93 of the pallet 12.

At this point the particular configuration of the reinforcement cage should be noted. The reinforcement cage comprises a plurality of vertical rods 94 and a helical portion 95 the convolutions of which are secured to the rods at the intersections thereof. The cage is preferably substantially centrally located in the pipe P from end to end. Of course the bottom portion of the cage can either be tapered outwardly or have an auxiliary cage of larger diameter affixed thereto in order to rest on the bottom pallet. The vertical rods can be formed to aid in properly positioning the cage initially.

FIG. 11 is a plan view of the concrete distributing means 28 showing the trough 30 in an extended condition for pouring concrete into the mold formed between the jacket and the core. The trough includes two parallel recesses 96 and 97 each containing a feed screw member 98 and 99, respectively. Special attention should be directed to the screw members since each is provided with a plurality of pairs blades 100, 180° apart, which are uniformly spaced throughout the length of the screw except for the area 101 immediately beneath the hopper 31. The area 101 has blades only on one side of the screw members so that, as each blade passes through the concrete, the blade pulls down and pushes forward some of the concrete. If blades were used on both sides of the screw members, the blades moving upward would be acting to compact the concrete preventing its fall, thus requiring a vibrator or other such means in the hopper 31 to keep the concrete flowing into the trough 30.

The rear ends of the screws are supported by motors 102 and 103 which drive the screw members and are individually controlled so that the screw members can be driven to rotate in opposite directions — either inwardly or outwardly. The forward ends of the screws are detachably supported by bearing members 116 and 117 so that they can be removed for cleaning.

The piston-cylinder arrangement 104 is used for moving the trough 30 inwardly and outwardly on the frame 29 on flanged wheels 105 to 108, moving on rails 109 and 110. The length of travel of the trough 30 is limited by the cushioned stroke of the piston-cylinder arrangement 104. It should also be noted that trough 30 has an arcuate recessed portion 111 which provides clearance for the core shaft 34 and intermediate portion 58.

Figure 12:
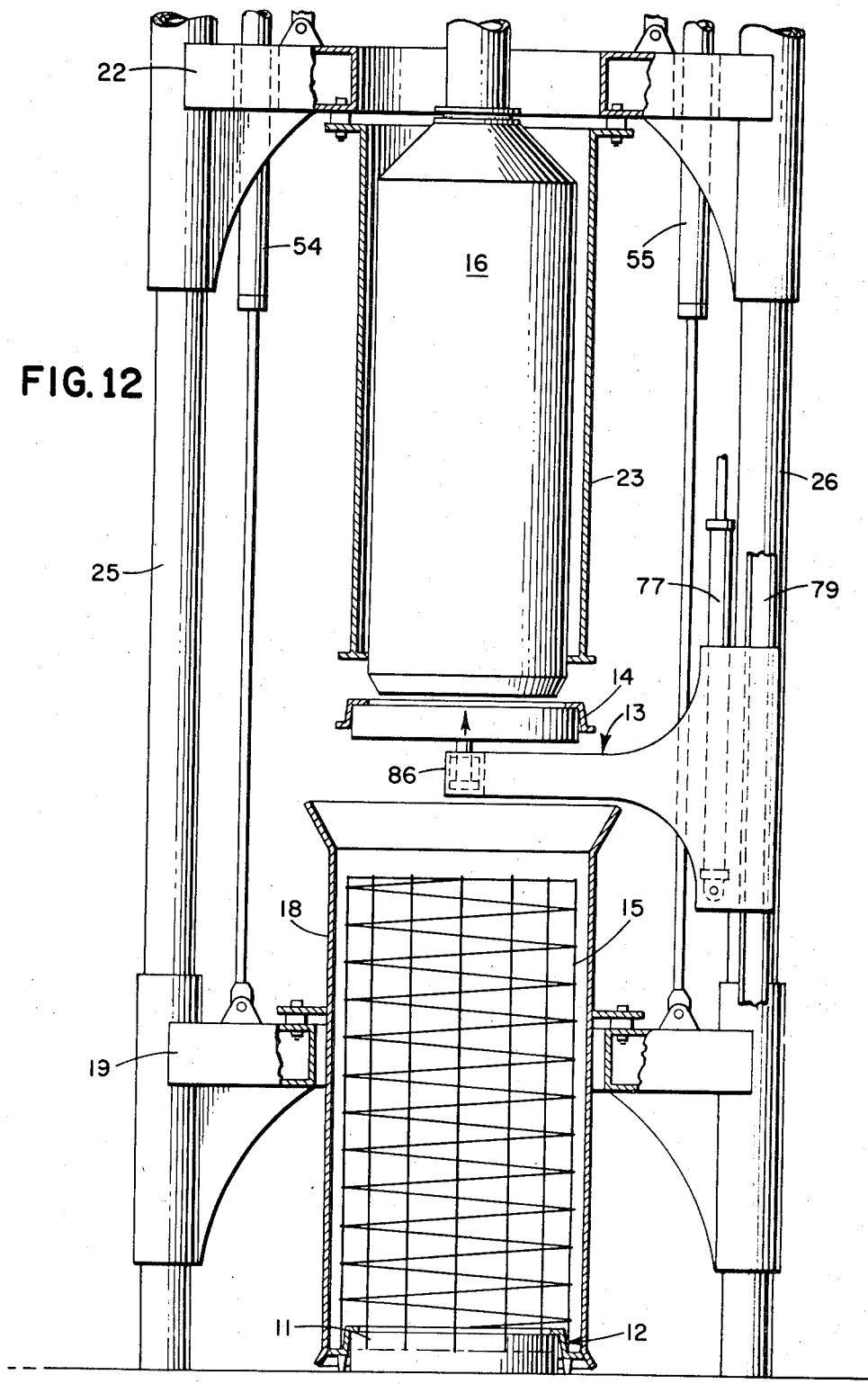
FIG. 12 is a front view, partly in section, schematically representing the operation of the present invention.
Figure 13:
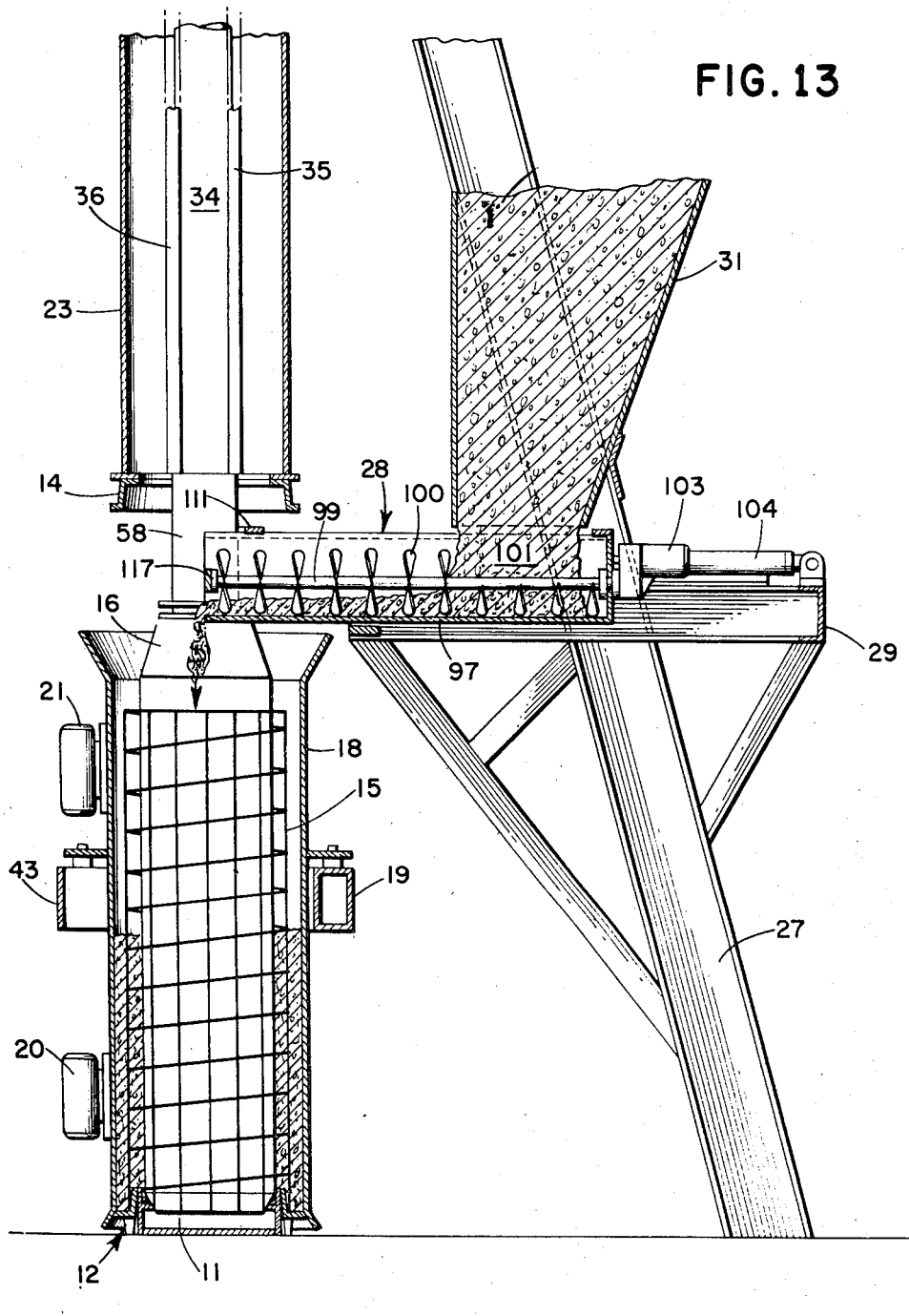
FIG. 13 is a side view of the device showing the pouring of concrete into the mold.

The method comprising the present invention will be described in relation to FIGS. 1, 2, 12, and 13. At the start of the cycle, the top pallet holding header, the core, and the jacket are in the up position (FIG. 1), the feed drawer is in the retracted position, and the feed hopper contains "no-slump" concrete mix (FIG. 2), the top pallet has been placed on the top pallet feeder. The operator first places the bottom pallet on the bottom pallet saddle. The elastic sealing ring 87 on the saddle holds the pallet legs slightly spaced off the floor (from ¼ to ½ an inch). The reinforcement wire cage 15 is then positioned on the pallet. The jacket 18 starts its downward motion and as it approaches the bottom, the outward conical flange 92 on the bottom of the jacket guides and aligns the jacket with the bottom pallet on the saddle. The elastic sealing ring 90 on the jacket makes a controlled sealing pressure contact with the bottom pallet in the down position. At this time the pallet legs 89 are substantially in contact with the floor. The top pallet feeder, with the top pallet thereon, swings laterally into the clear space between the top of the descended jacket 18 and the bottom of the core 16 and the top pallet header 23, which are still in the upper position as seen in FIG. 12. The pallet feeder stops in a position so that the top pallet is in vertical alignment with the top pallet holding header 23 and core 16. At this point the bottom of the core, where the taper 68 begins, is approximately 2 inches below the bottom of the top pallet holding header. As the top pallet on the pallet feeder rises by activation of the piston-cylinder assembly, the flared taper of the core guides the pallet into a near perfect alignment with the pallet holding header. Then the gripping jaws of the pallet holding header clamp onto the top pallet and lock it in place. The pallet feeder lowers to clear the bottom of the core and swings laterally out of the way and is subsequently lowered to a position where a new pallet can be placed thereon.

After the pallet feeder has cleared the core, the core is lowered through the pallet holding header and top pallet to its bottom position. The conical sealing surface 68 slightly compresses the elastic seal 87 of the bottom pallet saddle and forms a liquid-tight mold.

The concrete distributor extends so that the concrete can be fed to opposite sides of the mold. The recessed center 111 of the trough clears the core shaft and the feed screw members are preferably rotated in opposite directions to feed the concrete into the mold. The twin feed screw members start to deliver the mix and when the mold is approximately ten percent full, the core vibrator motor 59 is energized as well as the bottom jacket vibrator 20. When the mold is approximately 50 percent full, the core vibrator continues, but the bottom jacket vibrator 20 stops and the top jacket vibrator 21 starts. When the mold is filled to the proper height, the feed screw members stop and the trough is retracted. The top pallet locked to the top pallet holding header is moved downwardly onto the concrete mass to form the top tongue of the pipe. When it meets the mix in the mold the header vibrator 113 is energized so that the mix is subjected to the vibration of three vibrators, mamely, the upper jacket vibrator, the core vibrator, and the header vibrator. When the tongue is formed, the top pallet holding header releases the top pallet and moves upwardly approximately a half inch to take the pressure off the pipe. The top pallet remains on the top of the pipe until the pipe is cured and when it is manually removed along with the bottom pallet.

After the top pallet holding header has released the top pallet, the vibrators are stopped and the core and jacket are stripped upwardly. Preferably the core is stripped upwardly first. The top pallet holding header maintains its new position to prevent the top pallet from leaving the newly completed pipe. After the core is extracted, the jacket starts its upward movement with the top pallet holding header in the same position to keep the top pallet from rising. When the jacket is approximately seventy-five percent stripped from the pipe, the top pallet holding header then also rises leaving the top pallet on the newly made pipe. A fork lift then removes the newly made pipe from the machine and the cycle is ready to repeat.

FIG. 14 shows an alternate embodiment of the second crosshead, here noted as 22a. This crosshead is quite similar to the previously described second crosshead so that only the different features will be described. The core 16a is herein shown with the long axis perpendicular to the long axis of the apparatus. The pallet-holding head 23a is shown suspended by a four point suspension comprising of resilient pad and bolt assemblies 118 to 121 secured to gusset plates 134 which are welded in the bottom of the interior corners of a rectangular opening 136 in crosshead 22a with the vibrator 113a being disposed on the flanged portion 138 of the top pallet holding header adjacent the short axis of the opening.

Crosshead 22a is provided with holes 140a for the passage of cylinders 54 and 55. The piston-cylinder assemblies 71a of the top pallet gripping means are also shown.

FIGS. 15 to 17 show an alternate embodiment of the top pallet positioning means. This embodiment constitutes a substantial reduction in the number of parts in that the motor 80, transmission 81 and the piston-cylinder assembly 77 are replaced by a simpler means. In this embodiment the carrier 78 has connected to its upper side one end of a cable 122 which passes over a pulley 123 with the opposite end being connected to the first crosshead 19. Pulley 123 is journalled in a bracket 130 attached to a fixed crosshead 24. Thus as the first crosshead 19 is lowered to properly position the jacket 18, the top pallet carrier 78 will be raised to substantially the level of the bottom of the top pallet holding header, as previously described.

When the pallet carrier has reached the proper elevation, the piston-cylinder assembly 124, which is connected between a lever arm 125 on the H-beam 79 and the fixed crosshead 24, will be actuated to rotate the H-beam and top pallet carrier in the manner previously described to properly position the top pallet 14.

FIG. 16 shows a plate 126 which is an integral part of bracket 130 having a tubular member 127 which is welded to the web 132 of H-beam 79 extending through a bearing sleeve 129 welded to plate 126 and through which the cable 122 passes to be connected to the top pallet carrier 78. An orifice 128 is also provided in the plate 126 for passing the cable to be connected to the first crosshead 19. The H-beam 77 is pivotally mounted in bearings 129. In FIG. 17, the rotated position of arm 78 is shown in phantom lines.

FIG. 18 shows an enlarged vertical section of the lost motion device 160 shown in FIG. 15. This device comprises a tube 161 vertically mounted on the carrier 78 and having a lost motion rod 162 slidably mounted therein for movement between bushing 163 and the bottom 164 of tube 161. The upper end of the rod 162 is formed with an eye 165 for attachment of the cable 122. Of course any other suitable lost motion means could be substituted for the embodiment shown.

FIG. 19 shows a device 170 for making a lift hole in the pipe P and comprises a flanged orifice 171 formed on the jacket 18 in substantial alignment with the short axis of the pipe and substantially midway along the length thereof. A piston-cylinder assembly 172 is adjustably mounted on the first crosshead 19 to allow adjustment for various sizes of pipe. A ram 173 is operatively connected to the piston-cylinder assembly 172 for limited movement through the flanged orifice 171 to form a lift hole, the inner end 174 of which is closed, in the pipe P. This ram is preferably actuated after pouring of the concrete is completed and during final vibration of the mold. After the pipe has cured, and if it is desired to use the lift hole, all that is necessary is to knock out the inner end 174 of the hole.

As another alternative, the top pallet could be placed on the wire cage, the cage placed on the bottom pallet, the jacket and core lowered, the core preceding the jacket, until they are properly downwardly positioned, and then the top header lowered to contact and remove the top pallet and raise it to an upward position so that the concrete distributor might extend and commence feeding of the concrete to the mold.

It should be noted that the present invention may be used with any suitable off-loading type machine such as a fork-lifting truck or other means having fork or arm members which may be positioned under and engaged with the outer flange portion of the bottom pallet 12.

It is a desirable alternative to have the concrete contacting surfaces of the pallets coated with teflon or a similar substance so that they might be readily removed from the cured concrete pipe.

Specific examples of sizes of elliptical pipes of the type shown and produced by the present apparatus are six to eight foot lengths with cross sections of 14 inches × 23 inches having a 2 ¾ inch thick wall; 19 inches × 30 inches having a 3 ¼ inch thick wall; and 24 inches × 38 inches having a 3 ¾ inch thick wall.

As yet another alternate embodiment, the bottom pallet saddle can be formed on a carrousel so that as one pipe is being formed, a second saddle can be loaded with a bottom pallet and reinforcement cage while yet another saddle can be off loaded by any suitable means such as a fork lift truck. Thus the production time will be enhanced.

It is also contemplated, within the scope of this invention, to provide automatic positioning of the bottom pallet on the saddle. For example, an arm means could be rotatably mounted on frame member 25 and have on the free end thereof a means for holding the bottom pallet 12 until the arm is positioned to place the bottom pallet on the saddle 11 at which time the pallet will be released.

The concrete used in the subject invention is preferably a mixture of "no-slump" concrete which is of a comparatively dry consistency. A suitable "no-slump" concrete mixture would be 1100 lbs. sand, 950 lbs. stone, 450 lbs. cement and approximately 7–8 gallons of water, depending upon the moisture content of the other materials.

The invention may be embodied in other specific forms without departing from the spirit or essential characteristics thereof. The present invention is therefore to be considered in all respects as illustrative and not restrictive, the scope of the invention being indicated by the appended claims rather than the foregoing description and all changes which come within the meaning and range of equivalency of the claims are therefore to be embraced therein.

What is claimed is:

1. A method of forming a reinforced concrete pipe of any geometric cross-section comprising the steps of positioning a cored, geometrically shaped bottom pallet on a saddle with a first sealing ring to form a controlled pressure seal therebetween, placing a reinforcement cage on said bottom pallet, lowering a jacket into controlled pressure engagement with said bottom pallet and a second sealing ring therebetween, placing a cored, geometrically shaped top pallet onto a top pallet holding header, lowering a core through said top pallet, cage and bottom pallet into controlled pressure sealing engagement with said first sealing ring wherein said controlled pressure sealing engagement is formed by applying sufficient pressure to said respective sealing rings to deform each of said sealing rings into a liquid-tight seal between said jacket, said bottom pallet and said core while maintaining said pressure insufficient to compress said sealing ring into a vibration transmission state, pouring concrete into the thus sealed mold formed by said jacket, core and bottom pallet and sealing rings, vibrating said mold during said pouring of concrete, lowering said top pallet into the mold during the vibrating thereof to form the upper end of said pipe, stopping said vibration of said mold, releasing said top pallet from said top pallet holding header and sequentially stripping upwardly said core, said jacket and lastly said header leaving a finished reinforced concrete pipe on said bottom pallet and bearing said top pallet.

2. A method of forming a reinforced concrete pipe having a diametral cross-section of any hollow geometric shape from a mold having bottom and top forms each having the cross-section of said hollow geometric shape and inner and outer wall forms of said shape, a hollow support for said mold and a reinforcement for inclusion between said inner and outer walls prior to filling said mold with concrete, comprising the steps of positioning said bottom form on said support to form a controlled pressure sealing of the inner circumferential periphery of said bottom form and said support, positioning said outer form in centering engagement with the outer periphery of said bottom form to form a controlled pressure sealing of the outer circumferential periphery of said bottom form with the lower circumferential periphery of said outer form, positioning said top form coaxially above said outer form and concentrically above the lower end of said inner form as a guide for the movement of said inner form through said top form and bottom form to provide a controlled pressure sealing with said inner circumferential peripheries of said bottom form and said support wherein said controlled pressure sealing comprises forming a liquid-tight seal which will resist transmission of vibration between individual forms of said mold, pouring no-slump concrete into the sealed mold formed by said inner, outer and bottom forms, applying vibration to said inner form at least during said pouring of concrete, successively applying vibration to the lower half of said outer form and to the upper half of said outer form at least during said pouring of concrete, positioning said top form on said sealed mold during the vibrating thereof to press-form the upper end of said pipe, applying an additional vibration to said top form, stopping the applications of said vibrations to said mold, and sequentially removing said inner form and said outer form upwardly from said molded pipe while leaving said top and bottom forms on said molded pipe.

3. The method according to claim 2 wherein the positioning of said outer form in centering engagement with said bottom form simultaneously positions a top form having said cross-section coaxially above said outer form, and wherein the top form is then positioned concentrically above the lower end of an inner form for said cross-section as a guide for said movement of said inner form through said outer form and said bottom form.

4. The method according to claim 2 wherein the application of vibration to the lower half of said outer form continues until the mold is approximately half-filled with said concrete and the separate application of vibration to the upper half of the outer form begins upon cessation of said vibration to the lower half.

5. The method according to claim 2 comprising the additional step of forming at least one lift hole in the upper portion of said forming pipe.

6. The method according to claim 2 wherein said lift hole is formed prior to applying the vibration to said top pallet.

7. The method according to claim 2 comprising pouring said concrete into said sealed mold at two diametrally spaced zones on the upper periphery of said mold.

8. A method of forming a reinforced concrete pipe of a diametral cross-section of any desired hollow geometric shape from a mold having bottom and top pallets having the cross-section of said hollow geometric shape and inner and outer wall forms of said shape comprising a mold jacket and a mold core, a cored support saddle having an inner periphery substantially identical to the inner periphery of said bottom pallet and a reinforcing cage of said cross-section for positioning between the inner and outer wall forms, comprising the steps of positioning said bottom pallet to form the lower end of said pipe on said saddle, forming a controlled pressure seal between the inner circumferential peripheries of said bottom pallet and said saddle, lowering said mold jacket into centering engagement with the outer periphery of said bottom pallet, forming a controlled pressure seal between the outer circumferential periphery of said bottom pallet and the lower circumferential periphery of said jacket, positioning said top pallet coaxially above said lowered jacket, engaging said top pallet coaxially with a top pallet holding header having said cross-section and being positioned coaxially above said lowered jacket, positioning said header with the engaged pallet concentrically above the lower end of said mold core as a guide for the movement of said core, lowering said core through said top pallet on said header and through said bottom pallet into controlled pressure sealing engagement with said sealed inner circumferential peripheries of said bottom pallet and said saddle, pouring no-slump concrete into two diametrically spaced zones of the thus sealed mold formed by said jacket, core and bottom pallet and sealing rings, applying vibration to said core at least during said pouring of concrete, successively applying vibration to the lower half of said jacket and the upper half of said jacket at least during said pouring of concrete, lowering said top pallet onto the sealed mold during the vibrating thereof to press-form the upper end of said pipe, applying an additional vibration to said top pallet, stopping the applications of said vibrations to said mold, disengaging said top pallet from said top pallet holding header and sequentially lifting said core, said jacket and lastly said header from said molded pipe while leaving said top pallet on said molded pipe, said molded pipe resting on said bottom pallet, said controlled pressure sealing being established by applying sufficient pressure to said respective sealing rings to deform each of said sealing rings into a liquid-tight seal while maintaining said pressure insufficient to compress said sealing ring into a vibration transmission state whereby said forms are spaced from each other in non-vibration transmission relationship.

9. The method according to claim 8 wherein the lowering of said jacket mold into centering engagement with said bottom pallet simultaneously positions a top pallet having said cross-section for coaxial engagement with a top pallet holding header having said cross-section.

10. The method according to claim 8 comprising the additional step of forming at least one lift hole in the upper portion of said forming pipe.

11. The method according to claim 8 comprising the step of applying an anti-concrete adherence coating to the surface of the bottom and top pallets which come into subsequent contact with the poured concrete.

* * * * *